United States Patent [19]

McMillin

[11] Patent Number: 5,103,490
[45] Date of Patent: Apr. 7, 1992

[54] METHOD AND APPARATUS FOR STORING AND MERGING MULTIPLE OPTICALLY SCANNED IMAGES

[75] Inventor: John V. McMillin, Iowa City, Iowa

[73] Assignee: National Computer Systems, Inc., Eden Prairie, Minn.

[21] Appl. No.: 537,442

[22] Filed: Jun. 13, 1990

[51] Int. Cl.$^5$ .............................................. G06K 9/60
[52] U.S. Cl. .................................... 382/62; 340/734; 235/440; 235/470; 358/450
[58] Field of Search ................... 358/450, 452, 453; 340/734; 235/440, 456, 470, 471, 438; 364/962.2, 963.4; 382/48, 56, 61, 62

[56] References Cited

U.S. PATENT DOCUMENTS

| | | | |
|---|---|---|---|
| 3,284,929 | 11/1966 | Azure, Jr. | 235/454 |
| 3,444,517 | 5/1969 | Rabinow | 382/17 |
| 4,021,777 | 5/1977 | Shepard | 382/61 |
| 4,408,344 | 10/1983 | McWaters et al. | 382/62 |
| 4,542,378 | 9/1985 | Suganuma et al. | 382/61 |
| 4,627,819 | 12/1986 | Burrows | 235/462 |
| 4,654,877 | 3/1987 | Shimoni et al. | 382/56 |
| 4,677,551 | 6/1987 | Suganuma | 381/61 |
| 4,685,138 | 8/1987 | Antes et al. | 382/12 |
| 4,760,246 | 7/1988 | Shepard | 235/438 |
| 4,855,580 | 8/1989 | Van Maanen, Jr. | 235/440 |
| 4,872,062 | 10/1989 | Nanba | 358/443 |
| 4,877,948 | 10/1989 | Krueger | 235/456 |
| 4,889,367 | 12/1989 | Miller | 283/88 |
| 4,914,709 | 4/1990 | Rudak | 382/57 |
| 5,001,330 | 3/1991 | Koch | 235/436 |
| 5,003,613 | 3/1991 | Lovelady et al. | 382/17 |
| 5,010,580 | 4/1991 | Vincent et al. | 382/17 |

OTHER PUBLICATIONS

IBM Technical Disclosure Bulletin, "Document Format Selection and Control Process", S. G. Aden, G. M. Bednar, S. Hartman and R. G. Pierlott III, vol. 26, No.9, Feb. 1984.

Primary Examiner—Leo H. Boudreau
Assistant Examiner—David Fox
Attorney, Agent, or Firm—Dorsey & Whitney

[57] ABSTRACT

A method storing multiple scanned images of a response-marked form document comprises scanning a copy of the form document on which no response information has been marked, using a scanning method that detects substantially all visual information present on the form document and produces a pixel image thereof and storing that pixel image data in a computer storage device. Additonal steps comprise scanning at least one copy of the same form document that has been marked with at least one response mark that absorbs light falling outside the visible spectrum, using a scanning method that detects only the presence of light outside the visible spectrum and that produces a pixel image of said at least one response mark, then compressing that pixel image to reduce the amount of pixel data used to repressent areas of the form document bearing no response marks and storing the compressed pixel image data in a computer storage device. The visual scan pixel image and the image resulting from a scan for response marks can be merged together to produce a signal image that is comparable in quality and appearance to an image from a single, conventional visual-mode scan.

23 Claims, 4 Drawing Sheets

METHOD AND APPARATUS FOR STORING AND MERGING MULTIPLE OPTICALLY SCANNED IMAGES

RELATED APPLICATION

This application is related to a co-pending application in the United States Patent and Trademark Office filed concurrently with the present application, entitled IMAGE PROCESSING SYSTEM FOR DOCUMENTARY DATA, Ser. No. 07/537,293 which is assigned to the assignee of the present invention and which is hereby incorporated by reference in the present application.

TECHNICAL FIELD

The present invention relates generally to the field of optical mark scanning apparatus and image scanning and storing apparatus. More particularly, the present invention relates to a method and apparatus for capturing scanned images from multiple scanned documents having some redundant data and other variable data, efficiently storing scanned document images by storing redundant data only once and then merging two or more stored images to create a single combined image.

BACKGROUND ART

Optical mark scanning apparatus (hereinafter referred to as optical mark reading or OMR systems) are well known in the prior art. There are a wide variety of applications that use OMR systems and scannable forms in the large-scale gathering of discrete pieces of information recorded on documents (e.g., scores from standardized tests, census information, preference surveys, etc.). OMR systems generally sense data recorded with marks containing pigment that absorbs light in the near infrared range (e.g., No. 2 pencil mark) specific, predefined fields on a form. (This is called NIR-mode scannig.) Such data are position-encoded, in that their meaning is interpreted based on where the data has been marked on the form document used to record it. A primary advantage of NIR-mode scanning is that it allows separation of the respondent-marked variable data from the standard background printing on the same document.

Although a more recent development, visual image scanning apparatus (hereinafter referred to as VIS mode scanners or VIS systems) are also well known in the prior art. Most of the applications for current VIS systems have developed out of the desire to find replacements for traditional microfilm image capture systems. As a result, the focus of current VIS systems is on the acquisition of the total scanned image of a document, as compared to the detection, dark mark resolution and processing of discrete pieces of information recorded in predefined fields done by current OMR systems.

One of the limitations with current OMR systems that focus on predefined fields is their lack of any ability to scan or reproduce the context of a scannable form surrounding the predefined fields. As a result, the retrieval and viewing or hard copy replication of the stored or archived discrete, raw information from a form scanned by an OMR system is of limited value, because there is no capability for interpreting that information without resorting to the form, a transparent overlay, or even a booklet associated with the form, as is the case in standardized testing.

VIS systems, on the other hand, are capable of reproducing the entire contents of a scannable form (both standard background printing and any variable data) as a digitized, pixel image, but any associated OMR processing logic cannot easily interpret or analyze any of the discrete, variable information contained in a VIS-mode pixel image of the form. A great deal of digitized data, both fixed and variable, can be collected by VIS images, but the meaning of the variable data remains to be extracted and not all of the VIS-mode data collected may be of interest. For example, if an $8\frac{1}{2}'' \times 11''$ piece of paper is scanned at a resolution of 120 dots per inch (DPI), vertically and horizontally, and with an eight-bit grayscale, more than 1.3 megabytes worth of bit-level scanned information may be generated from this single page. Obviously, a tremendous amount of computer processing power may be necessary to extract and analyze significant bit-level information representing the variable data or localized pixel segments (often called areas of interest or AOI's) from a form scanned with a VIS system. More importantly, the storage requirements for storing all of this information in a situation where hundreds or thousands of documents are being processed to capture a complete pixel image as a by-product of capturing the variable data is so large as to be prohibitively expensive in most applications. When data are recorded on standard forms, much of the data collected in a VIS system is redundant. What is needed is a scanning system and method that permits repeated data on standard forms to be scanned and stored once, while variable data, such as pencil marked test answers, signatures, other respondent-marked data, are scanned and stored at every occurrence and that permits the relationship between variable data and repeated data to be recovered.

SUMMARY OF THE INVENTION

In the output presentation of document images captured by scanning, where output may be either to a CRT (or other electronic) display screen or in hard-copy reproductions of the originals, there are certain advantages resulting from a means to merge two or more separately captured images into a common output format. This technique is especially useful if the distinct images are captured under different, selective scanning conditions, such that one or more of the images to be merged contains only an incomplete portion of the material printed or marked on a source document.

For example, the first image may consist of a "master form", having been generated from a visual-mode scan of a blank (no filled-in variable data) example of the form document. Such a form usually contains a pre-printed configuration that informs the user of data to be recorded and where to record it. The second document image, in turn, may result from an NIR-mode scan of a copy of the same "master form", but in this case containing filled-in variable data recorded with an ordinary No.2 pencil. Such a document may be called a "response-marked form". The resulting bit-map image of a response-marked form contains only two "classes" of pixels; those comprising the white (data void) background of the document, and the pixels that have appreciable grayscale content, representing areas on the form containing the pencil marks. The areas containing the preprinted text, lines, graphics or "boiler plate", as this information is sometimes called, are included in the white background class, because the colored inks used to print this matter on the form are not detected in the infrared spectrum. (Such inks are sometimes referred to as dropout colors, with respect to the defined NIR-mode spectral range for a given scan capture.)

Because only the variable, pencil data are detected by scanning in the NIR-mode (appearing as occasional dark marks against a more or less uniform "white background") the potential for efficient data compression is increased significantly, as it is not necessary for the compression algorithm to deal with the redundant data that would otherwise consume compressed-date storage space if scanned in the visible (ink-detected) mode. Therefore, near infrared scanning of response-marked forms—when the variable response data can be restricted to No. 2 pencil entries or other marking instruments producing detectable marks—is an attractive means of capturing, compressing and storing the variable response data from a batch of response-marked forms containing significant data that is redundant from form to form, due to the standard printing on the master form.

In accordance with the present invention, a method and apparatus for capturing, storing and merging multiple scanned images captures OMR scanned images of variable data marked on a form document, using a near-infrared light source, and also (in a separate, independent process) captures visually scanned images of unmarked form documents, using a visible spectrum light source, and stores both. When display of a response-marked form is desired, the two types of images stored are merged to create combined images.

In the preferred embodiment, one of the images captured is a "blank" or unmarked master form. Far from being blank visually, this form is only "NIR blank" and typically contains rules, lines, boxes, preprinted text, logos, graphics or other identifying characteristics which do not change from user to user (e.g., respondents filling out forms). The unmarked master form image is captured using a VIS scanner and stored as an unmarked master document image in a data processing system.

Additional images are captured from response-marked copies of the master form containing data filled in by a respondent using a No. 2 pencil or other marking instrument producing detectable marks. Information on these documents is scanned using an OMR scanning system with a special light-detector system responsibity (i.e., principally sensitive in the NIR range). Due to the special spectral responsibity, the preprinted matter on the response-marked master form is not detected with the OMR scanner; only the variable response data marks are captured and stored as unique response record information in the data processing system.

When an image of a specific response-marked document is needed, the data processing system merges the unmarked master form image with the unique response record information image to produce a single document that can be viewed either on a screen or in a hard copy.

A primary objective of the present invention is to provide a method and apparatus that allows a VIS image of an unmarked master form to be combined or merged with an OMR image of a response-marked form to produce a single image that is comparable in quality and appearance to a conventionally-captured VIS image.

Another objective is to reduce the amount of memory space required to store the information associated with response-marked form documents with variable recorded data.

A further objective is to provide a method to reproduce the entire contents of a scanned, response-marked form; to allow display, interpretation or analysis of any of the discrete information recorded on that form; and to reduce the amount of computer processing power required to accomplish this objective.

A still further objective is to provide an image processing system that permits scanned images to be merged and to incorporate the merge technique successfully in "real world" documents that contain normal printing tolerances, dimensional variations due to temperature and humidity, mis-registration and feeding artifacts that occur during document image-capture and other anomalies that occur at various points in the scanning process.

These and other objectives of the present invention will become apparent with reference to the drawings, the detailed description of the preferred embodiment and the appended claims.

DESCRIPTION OF THE PREFERRED EMBODIMENTS

Figure 1:
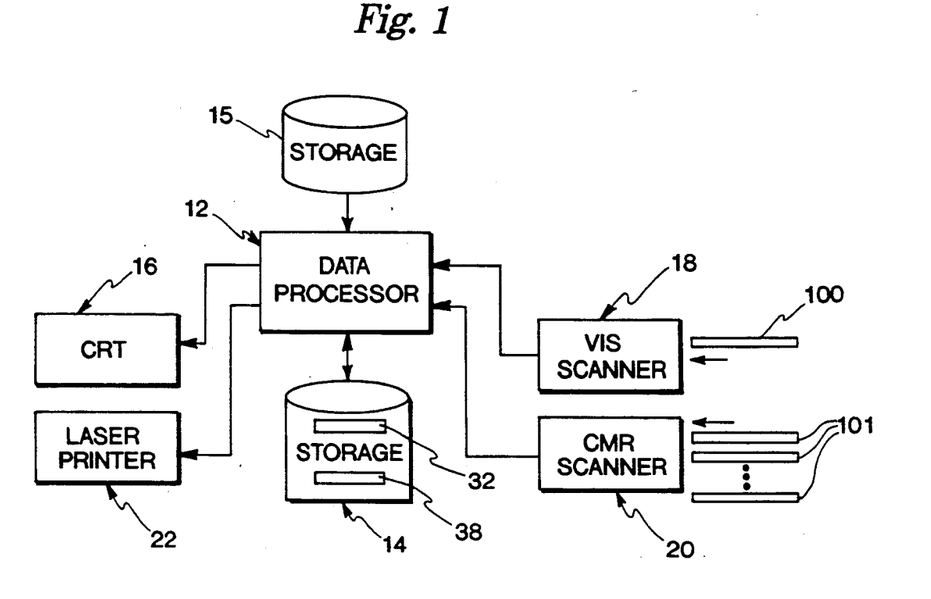
FIG. 1 is a block diagram of an apparatus for capturing, storing and merging multiple scanned images in accordance with the present invention.
Figure 2A:
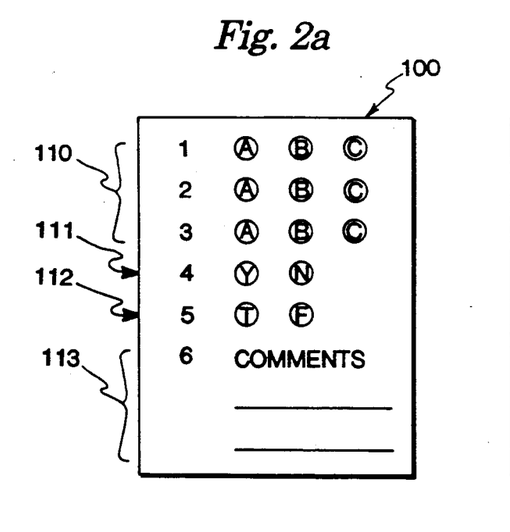
FIG. 2a is a plan view of a simplified, unmarked master form document as used in the present invention.
Figure 2B:
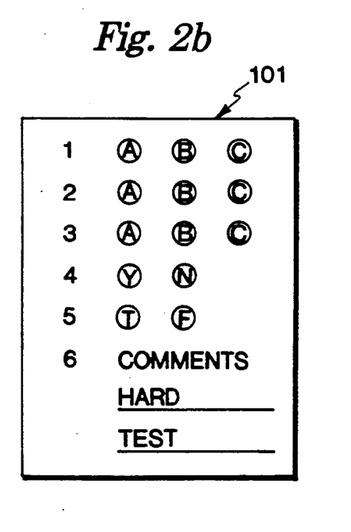
FIG. 2b is a plan view of a copy of a simplified master form document as in FIG. 2a on which response data have been recorded.

Referring to FIGS. 1, 2a and 2b, the basic components of an apparatus used to capture, store and merge scanned images in accordance with the present invention are shown.

While, as will be described below, the present invention is applicable to many data handling tasks, for purposes of explanation, a task involving data collected by having respondents mark on a standard form document will be described. FIG. 2a shows a simplified, unmarked master form document 100 with six response areas of the kind typically used on scanned documents. These consist of three multiple choice response areas 110 (Nos. 1-3), one yes-no response area 111 (No. 4), one true-false response area 112(No. 5) and one fill-in-the-blank area 113 (No. 6). The circles and underscores define preprinted response areas containing indicia such as A, B, C or Y and N or T and F. These indicia correspond to response options for a predefined set of questions or other response-stimulating items, usually found in a printed booklet with which the respondent works but which may also be on the master form 100 itself. All notations on the document in FIG. 2a are preprinted. FIG. 2b shows the same form as in FIG. 2b, except that responses have now been recorded, by marking the defined response areas or filling in blanks.

In a typical data collection application unmarked form documents will be distributed to dozens, hundreds or thousands or respondents. Each respondent is asked to record his or her responses by marking on the form provided. When the response-marked forms are collected, the usual task is to scan each one to extract the response data and convert it to more easily manipulated electronic data form. While the original response-marked forms may thereafter be discarded, in the applications of interest for the present invention, the user desires to maintain the ability to archivally store and later recover an image of the actual response-marked forms. The present invention provides a method and apparatus for storing electronically only the variable data from the response-marked forms and recovering the actual image by merging such stored images of variable data with a stored image of the unmarked form master.

As shown in FIG. 1, the unmarked master form document 100 is scanned using a scanner 18 with visible spectrum illumination (VIS mode) to capture all visual information on the scanned side of the document, such as preprinted text, lines and response areas outlines. This information is stored on memory device 14 as a master form image record 32. Because most forms contain a certain amount of unprinted space, a standard "lossless" image compression program (such as those known under the names "Runlength", Huffman or "LZW") is preferably used to process and size-reduce the raw pixel data in the frame grabber within scanner 18 before "permanently" storing the master form image record 32. Thus, the image stored accounts for every pixel in the image of the master form 100, but "lossless" compression permits this to occur in something less than the storage required for a non-compressed, full, pixel-by-pixel image.

Response-marked documents 101 are scanned in an OMR scanner 20, preferably one using an NIR mode. (It would be possible to avoid the use of two separate scanners 18, 20 with a single scanner capable of scanning in both VIS and NIR modes. For example, by switching illumination sources or by using a filter that only passes near-infrared light, the scanner 18 could be changed to a mode in which it will detect only response markings made with pigments containing carbon or graphite that absorbs this light spectrum. Another approach would be to employ a single scanner with illumination covering both NIR and VIS light ranges, then using beam splitting and filters to carry out NIR and VIS mode scanning simultaneously. The basic construction for a scanner suitable for use in the present invention is shown in U.S. Pat. No. 4,300,123 issued Nov. 10, 1981, naming John V. McMillin and Dale W. Schroeder as inventors.) The NIR or OMR mode scanner 20 scans each response-marked form document 101, developing in the frame grabber within scanner 20 a complete pixel image of response markings on that document. Again a conventional lossless program (such as those identified above) is preferably used to store the image. Because the preprinted matter on the document 101 is not detected in this OMR mode scan, the response image record will only consist of spatial (x,y) location and grayscale information for a relatively small number of areas on the document 101. Accordingly, a very high degree of compression can be obtained, over 90% in a typical application. In effect, using a scanning mode that does not detect the preprinted portions of the response-marked form document results in a substantial "pre-compression" of the data to be stored, before the conventional compression step is performed. This doubly-compressed information is stored on memory device 14 as unique response image record 38. If multiple response-marked documents 101 are scanned, the process of OMR scanning and storing additional unique response image records 38 is repeated with subsequent response-marked documents.

A computer program in the data processing device 12 directs the scanning process and storage of records 32, 38, invoking the compression programs as needed to process full pixel images of scanned documents. If desired, the amount of data captured and stored in either VIS or NIR mode can be reduced by defining certain areas of interest as the sole areas for which image data will be preserved. For example, in the forms 100, 101 in FIGS. 2a and 2b, item No. 6 and the associated response blanks might be defined as an area of interest.

Figure 3:
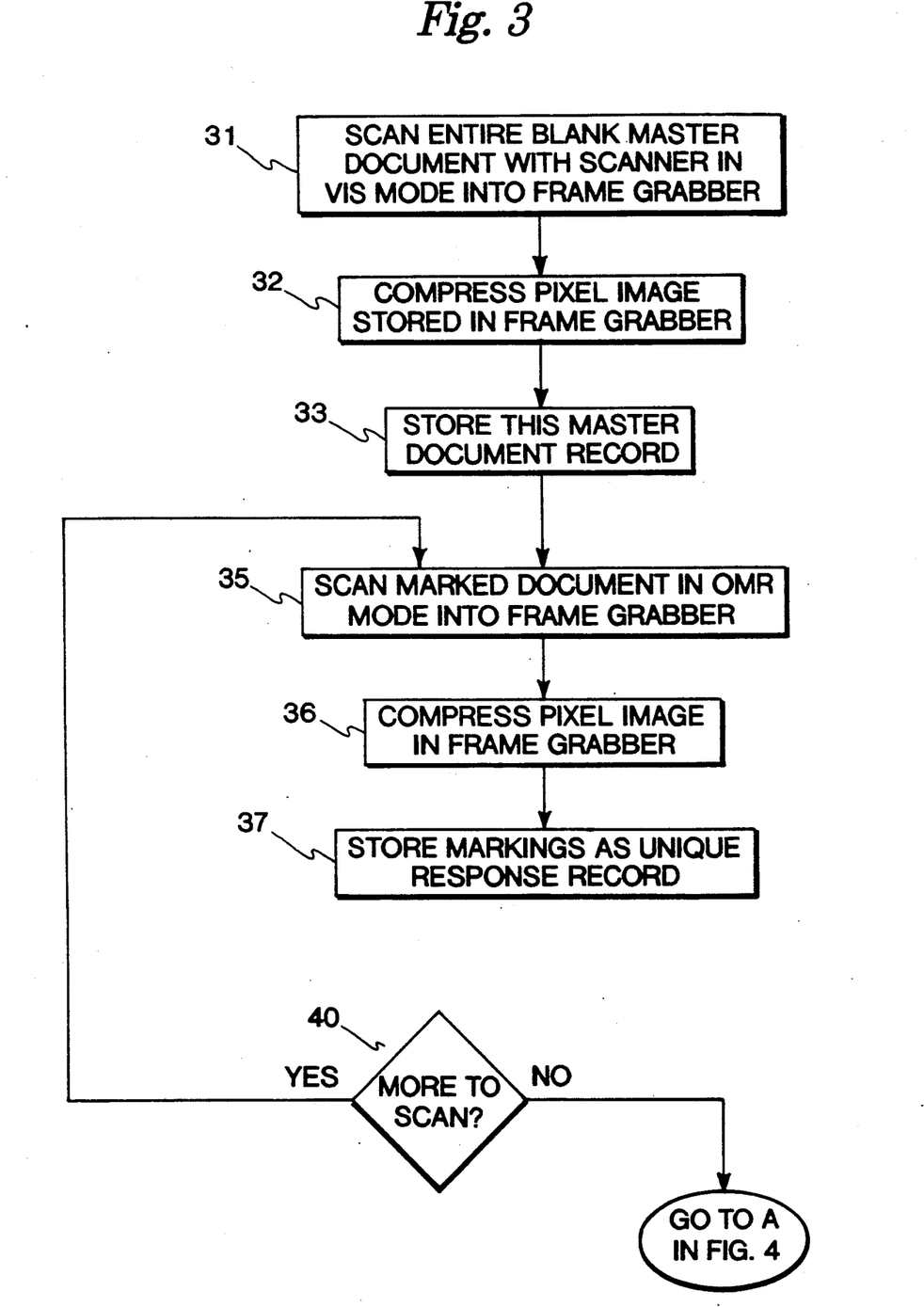
FIG. 3 is a flowchart showing how an unmarked master form document and multiple response-marked form documents are scanned and stored in accordance with the present invention.

FIG. 3 shows a simplified flowchart of the scanning and record storage process. It includes the steps of scanning 31 the unmarked master form document in VIS mode to fill the frame grabber, compressing 32 the pixel image in the frame grabber, storing 33 the compressed master form image record, scanning 35 a response-marked form document in OMR/NIR mode, compressing 36 the pixel image in the frame grabber, storing 37 the compressed response markings only as a unique response image record, determining 40 whether there are more response-marked documents to scan and either returning 42 to the response-marked document scan or transferring 44 control to a wait mode, waiting 52 for an image retrieval request (see FIG. 4).

Even if no display of the response-marked documents is ever required, the present invention provides a significant advance over prior art systems for capturing data on form documents, because of the dramatic reduction in the data that needs to be stored. Moreover, by using two spectrally distinct scanning modes, including an NIR mode for detecting response markings, the present invention avoids a difficulty that is present in performing OMR reading in a VIS mode. In a VIS mode, all the preprinted ink on a response marked form acts a noise that makes the detection of markings more difficult. Further advantages of the invention arise by reason of its capability for reproducing the image of any response-marked document that has been scanned and saved in accordance with the preceding methods. This is done by merging the VIS-mode captured and stored image of the unmarked master form document with the desired NIR-mode captured and stored image of markings extracted from a response-marked form.

Figure 4:
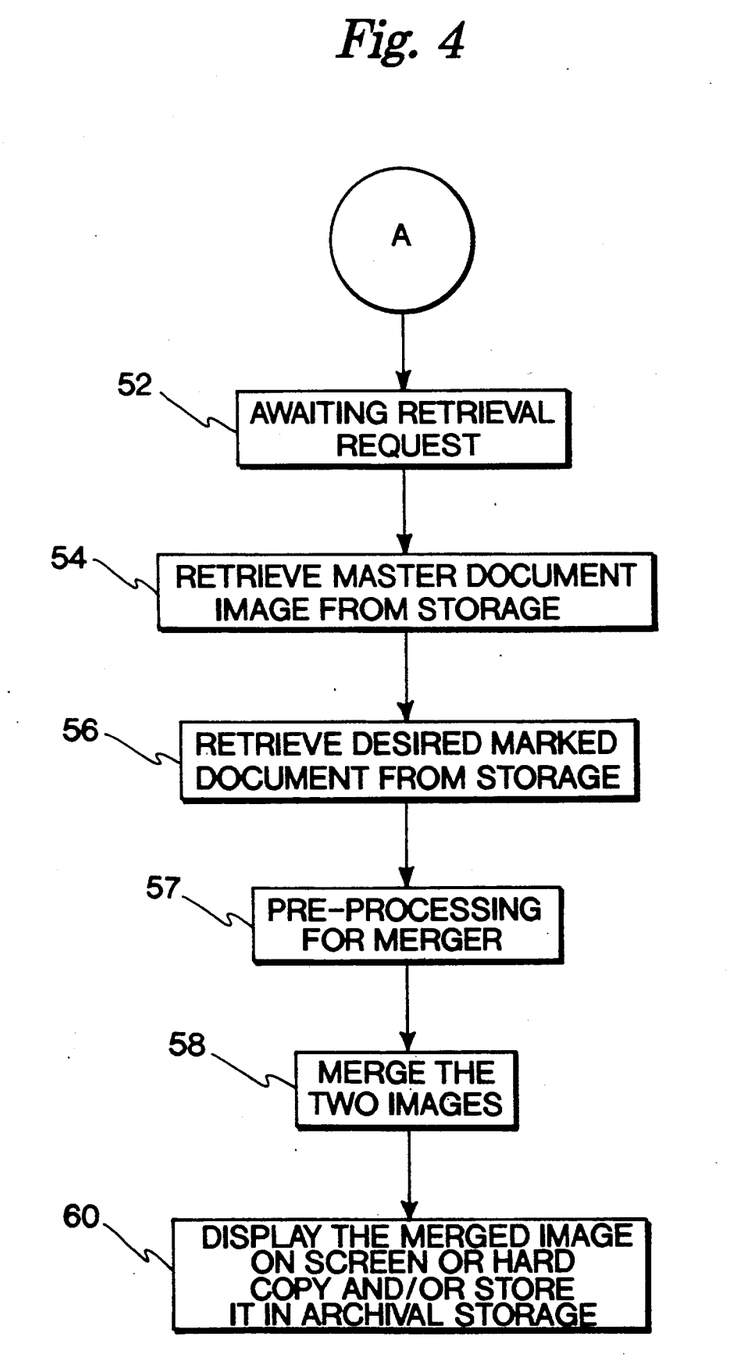
FIG. 4 is a flowchart showing how two captured images are merged and displayed in accordance with the present invention.

Referring to FIGS. 1 and 4, the basic operative components and steps used in displaying a merged image are shown. When an image of a particular response-marked form document 101 is requested, both the master form image record 32 and the unique response image record 38 for the requested, response-marked form form are retrieved 54, 56 from storage 14. These images are merged in the data processing system 10 in the manner described below and the merged image is displayed 60 on a display 16 (such as a CRT or flat panel electronic display) or printed on a laser or other printer 22. If desired, the resulting merged image may be stored 60 for archival purpose on archival storage medium 15. In general, the merger process simply consists of decompressing the respective stored images (AOI images if merger of a defined pixel area less than a full document is desired and) overlaying the grayscale value for each pixel representing response markings from a response image record 38 on the corresponding pixel (same location) from a master form image record 32. Grayscale values may vary from the simplest situation where there are only two levels in the grayscale range, black or white, represented by a single bit, to grayscale ranges having 256 or more possible levels represented by eight or more bits. That is, the grayscale value for a pixel from response image record 38 simply replaces the corresponding grayscale value from master form image record 32. (Variations on this replacement approach are discussed below.)

Either at the time the records 32,38 are stored or at some later time before they are merged, the records must undergo one or more steps of pre-processing, discussed below, that aid or enhance the merger process. For simplicity, FIG. 4 shows a single preprocessing step 57 occuring before the step 58 of merging two images. Such pre-processing will usually include the correction of skewing or other anomalies known to occur during scanning that impair the integrity of scanned images.

Figure 5A:
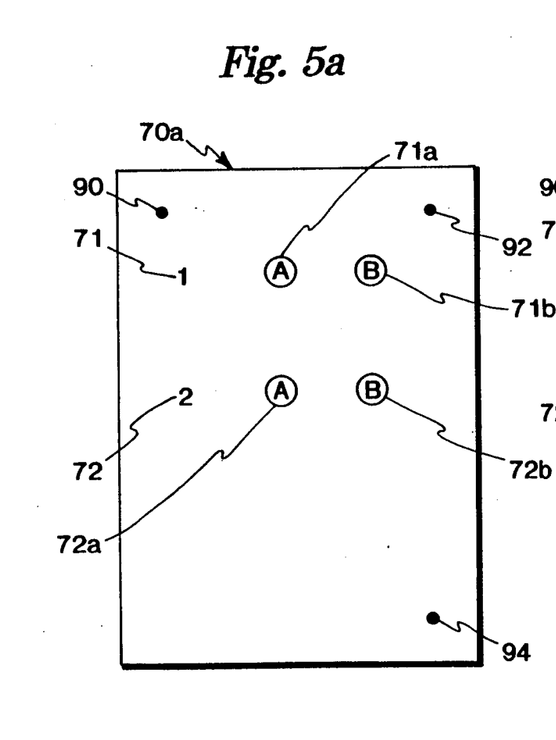
FIG. 5a is an image of a simplified, unmarked master form document as stored by the present invention.
Figure 5B:
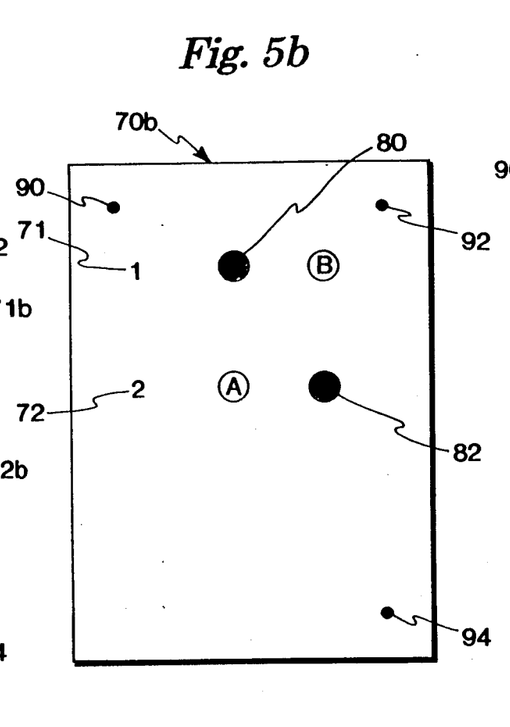
FIG. 5b is a plan view of the simplified master form document of FIG. 5a, now with responses marked, and also a view of the merged image produced by merging the images of FIGS. 5a and 5c.
Figure 5C:
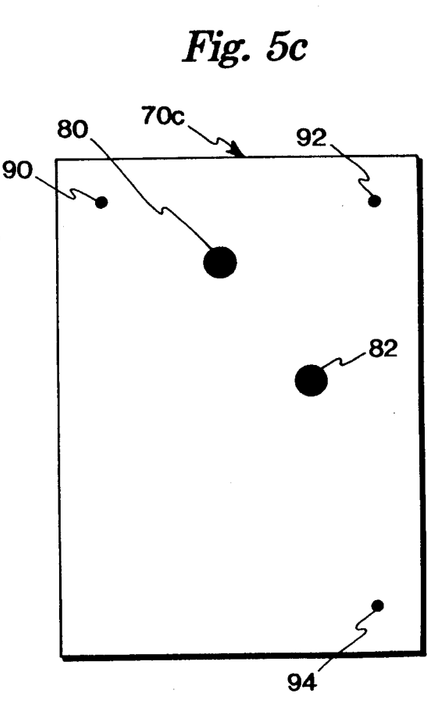
FIG. 5c is an image of the response-marked form of FIG. 5b as stored by the present invention, with only the response marks and triangulation marks captured.

The simplest case of merging two images captured by the present invention is illustrated in FIGS. 5a, 5b and 5c. FIG. 5a shows an image of a highly-simplified, unmarked master form document 70a having two response items 71,72, each with an A and a B response option, as indicated by the labels within circular areas or bubbles 71a,71b,72a,72b. Form image 70a also has three triangulation marks 90,92,94, used for alignment, as will be explained below. It should be noted that the triangulation marks 90,92,94 are preprinted but are printed in ink (e.g., black ink) that will be detected in the NIR mode scan as well as in the VIS mode. Form 70a is "blank" or unmarked; it has no recorded response and no spurious marks. FIG. 5b shows a response-marked copy 70b of master form 70a on which response marks 80 and 82 have been placed by the respondent. The triangulation marks 90,92,94 also appear here. FIG. 7Oc shows the image of FIG. 70b that is obtained by an OMR scan of marked copy 70b. Only the two marks 80,82 and the triangulation marks 90,92, 94 are part of this image. The triangulation marks 90,92,94 are the only part of this image not marked in by the respondent.

If perfect form printing and scanning are assumed and if all response-marked forms 70b are the same size as and are scanned at the same dots per inch (DPI) resolution and grayscale range as the unmarked master form image 70a, then both the master form image record 32 and the unique response image record 38 that represents FIG. 5c will have the same bit-map image formats after decompression into the system's merged storage buffer (temporary storage) prior to CRT viewing, hard copy printing or archiving of the merged image. That is, there will exist a perfectly aligned, one-to-one correspondence between each pixel location in these respective stored images and their grayscale information will correspond directly. In this circumstance, there is no need to do any dimensional scaling, and the triangulation marks 90,92,94 are unnecessary. To perform a merge, all that is needed is to know the x-y offsets of the pixel information representing the two marks 80,82 from some standard origin point and to decide on the rule for overlaying unique response image record 38 on master form image record 32. If the overlay rule is that the grayscale value for each pixel in each unique response image record 38 replaces the corresponding grayscale value for the same pixel in the master form document record 32, then the merger of the two images is complete as soon as this replace operation is carried out by the data processing system 12 for each pixel stored as part of unique response image record 38. If this merged document is displayed on CRT 16 or printed on laser printer 22, it will appear to be the same as the image of FIG. 5b, showing the marked master form 70b.

While some real-world document scanning and merging tasks may approach the simplicity of the example just described, it is likely that the requirements of the particular scanning and merger application of interest will be more challenging and require various forms of additional processing of the images merged, either at the time of image capture or the time of merger (or both) to provide the desired image. The following is an itemization of variations on the simplest merge task that may be encountered and may be accommodated by the present invention.

1. DPI scaling needs, caused by images of different dimensions and or with different DPI scales;
2. grayscale differences or grayscale adjustments;
3. variations in merge operators;
4. changing of location offsets of merged data;
5. correction or scanner of printing anomalies, including, rotation or skew problems, non-linear rotation and optical distortion.

DPI Scaling

In the preferred embodiment of the present invention, unmarked master form documents captured using VIS mode may be scanned at a different pixel dimension resolution than the response-marked forms scanned using OMR mode. Through the use of a scaling program contained in the data processing system 12, the differences between these two pixel dimension resolutions can be adjusted and the merged document can be displayed in the desired resolution.

For example, suppose unmarked master form image 70a is captured at 120 DPI horizontally and 90 DPI vertically, and that response-marked form image 70b is captured at 200 DPI horizontally and 150 DPI vertically. Furthermore, suppose both images represent an 8.5"×11" page-size source document. Accordingly, the pixel dimensions of unmarked master form image 70a are $1020_x$, $990_y$, whereas response-marked form image 70b has pixel dimensions of $1700_x$, $1650_y$. Let the scaling ratio factors for image 70a be set at $2.5_x$, $3.33_y$, and the scaling ratio factors for image 70b be set at $1.5_x$, $2.0_y$. Thus, the new, rescaled pixel dimensions for both of the images are now $2550_x$, $3300_y$, or equivalent to synthesized resolution of 300 DPI. For this set of scaling ratios, either of the two separate images, or the rescaled merged image will appear in the hard-copy in a 1:1 ratio to "true size" when printed on a 300 DPI laser printer. A variety of scaling ratio sets can be selected to uniformly decrease or increase the final hard copy size or the CRT display size with respect to the original dimensions and the DPI resolution of the printer. The scaling program preferably incorporates interpolation ramps rather than fat-bit replication, which provides smoothed grayscale gradients when upscaling or, conversely, generates optimum pixel subsampled bit-maps when downscaling.

Grayscale Differences

In accordance with this invention, an unmarked master form document that is scanned at a different pixel intensity range (or grayscale content) than a response-marked form is remapped (or vice versa) to adjust for these differences, before the images are merged by a program contained in the data processing system 12.

This is accomplished by remapping one or more of the images into a common level of grayscale. Using the remapping program, the one-time scan of the unmarked master form may be performed at high grayscale content and high DPI resolution and the higher speed, higher volume batch run of data-bearing forms may be captured at lower grayscale content and DPI resolution. Benefits from this preferred method include, increasing processing speed, compression efficiency and meeting space storage limitations.

Any number of bits/pixel from 1 to 8 may be used for the grayscale. In most practical document image-capture systems, the grayscale range is from 2 levels up to 256 levels, or an equivalent range of 1 to 8 bits for each pixel of the image. For example, if the unmarked master form is scanned (VIS-mode) at 8 bits/pixel for maximum quality (e.g., the dynamic index range is 000–255), but the data-bearing form is scan-captured at only 4 bits/pixel (OMR-mode), the latter must be re-mapped in such a way that the 16 grayscale levels (4-bits/pixel) span the entire 000–255 range of the "master" before the merging step takes place. Thus, the grayscale Hex 1 level for the 4-bit image is linearly re-mapped to index 17, grayscale Hex 2 level is remapped to index 34, and so on, with grayscale Hex 14 remapped to 238, and grayscale Hex 15 to 255. Non-linear re-mapping (e.g., logarithmic), or gamma control processes, such as are common to manipulate contrast levels in the photographic industry, can be readily implemented for even greater flexibility and control in the merge sequence.

Another point on grayscale levels that affects image quality can be mentioned. When response-marked document images are captured in OMR mode, the white background index level should be set slightly closer to saturation-white level (index 255 in an eight-bit per pixel system) than the white level for VIS mode scanning of the unmarked master form. This assures grayscale-level uniformity in the background of the merged document because a merging program selects the darker of the two pixel values when the images are merged (in the absence of a different merge operator).

Merge Operators

In the normal use of the merge technique, the merging of marked response data onto a corresponding master form implies that this step be performed mathematically in the "merge" sense; that is, the darker index value of each pixel (furthest away from white 255 or closest to 000) is the surviving pixel value in any merged area. However, a fully flexible merge algorithm can offer an arbitrary "merge operator" for the output pixel from any two (or more) sets of bit-map images; that is, the pixel resultant from merger of differing grayscale values can be opaquely joined (e.g., replace the old with the new value regardless of respective index values) or could be cumulative, or for that matter, follow any other pre-defined Boolean or algebraic expression.

Location Offsets

Any one image to be merged onto another may be offset by an arbitrary magnitude from a "master" reference set of x,y coordinates, instead of simply being merged by direct overlay onto the same pixel area from which it originates. The ability to mathematically "slide" one bit-map image around over the "surface" of another before the actual merging process is executed is useful for the successful output of hard-copy or for a CRT display. Otherwise, the user will often observe a misalignment of the (merged) "real world" variable data from a response-marked form as it is placed into the preprinted context of the unmarked master form. Such misalignment, if sufficient, may cause the "authenticity" of the merged output image to be questioned. Therefore, all forms of the set to be included within the "merged composite" family must contain three or more pre-printed indicia or "triangulation marks" (detectable in each of the respective scanning spectrums, such as VIS, NIR, etc.) so that the "sliding" or translation algorithm "knows" the x,y pixel offset values from "home position" for each image, and thereby knows how much to "slide" any or all of the individual bit-maps before the actual merge is executed. It is important to note, that in the general case, it is not required that the three triangulation marks be in the same location on the merged forms, but only that the x,y reference coordinates be known, a priori (e.g., preprinted ID codes on the sheet) for the respective document images, before merging takes place. When a "full-size" image is being merged onto another there must necessarily be a "cropping effect"—that is, loss of boundary/edge data, whenever the translation offsets have finite values (e.g., non-zero $\pm N$ pixels). In some applications, the image that is translated to another location before merger may be an image of only a small area of interest. For such a merge, cropping is rarely a problem, because the area of interest that is translated will have been selected and moved to a particular location for a purpose and with due consideration to the size of the image translated and the location of the area onto which it will be overlaid.

Correction of Anomalies

Occasionally a document scanned (either an unmarked master form or a response-marked form) is not fed perpendicularly to the scanning axis, but rather is skewed or rotated slightly during the image capture process. Even if all other geometric parameters and scaling factors are properly accounted for, the merged image will exhibit incongruence between the separate components that are merged if skew is present. Therefore, by means of detecting the presence and interpreting the x,y location of three or more triangulation marks from each scanned image, a rotating program in the data processing system 12 cam deskew and correct any rotated images before the actual merge sequence is executed. As mentioned earlier, the set of triangulation marks need not be in the same location on all documents, but merely their location pre-defined for each document type in the set. Moreover, the triangulation marks permit correction of rotation anomalies, whether they are from clockwise or counterclockwise rotational skew errors.

As discussed above, the two images to be merged may have different DPI resolutiions, sizes, pixel$_{x,y}$ dimensions, aspect ratios, or spectral responsivities. This further implies that the two documents may be captured on different scanners. For example, the unmarked form master, which requires a one-time scan, may be captured on a low speed (a minute or more per capture), inexpensive, but high resolution (300 DPI) VIS-mode desktop scanner, whereas the response-marked forms are likely to be scanned on a high-performance OMR-mode scanner at thousands of documents/hour. The respective optical front end path length of these two scanners comprised of lens, mirrors, glass plates, light source, CCD array length and pitch, magnification factors, F/stop settings, focal length, and bandwidth block/pass filters are necessarily different.

All optical systems comprised of the preceding components exhibit various distortions or nonlinearity along the 8.5" width of a full-size page document. For example, if one edge of the sheet is defined as the 0-pixel reference, then for a 1020 pixel length along the 8.5" scan/axis (e.g., a 120 DPI resolution), the quarter-distance point of 2.125" (8.5/4=2.125) ought to occur at pixel No. 255 (1020/4=255) in the CCD (charge coupled device) array used to detect scanned images in most advanced OMR scanners. Actual measurements, however, will show a several pixel departure from this ideal, and the error will vary from system to system as the above parameters are changed. The focal length and optical quality of the lens, in particular, have a significant influence on X-axis scan nonlinearity.

Earlier discussions explained how two images with different DPI's, sizes, x-y offsets, rotations and pixel dimensions can be congruently aligned with the merge technique discussed. This capability, as described in the programs included in the preferred embodiment, assumes, that the various image processing operations are dimensionally "linear" or isomorphic with respect to the underlying mathematical rules. For example, an x-scaling ratio of 2.5 is applied to all x-sweeps of the entire image, or the entire image is rotated 0.31°, or the entire image is "slid"+$5_x$, $-7_7$ pixels, on so on. The x-axis optical nonlinearity is corrected using a scaling program to apply a "transform function or lookup table" against the nominal scaling ratio. In the cited example, the 2.5X ratio must be further modulated by some function (a 5th order polynominal is typically used to specify lens distortion) to correct for the discrepancy caused by lens distortion (and minor shifts caused by the reading head glass plate diffraction offsets) between the pixel number and actual detected position on the document. The function (or lookup table) itself is heuristically determined by measurements taken from precision optical targets (e.g. black/white line-pairs printed on a stable, white-reflecting base, such as Kodak Estar). The line-pair frequency is made high enough to identify individual pixel x-axis locations and shifts when viewing the CCD output signal on a scope, or analyzing corresponding pixel index values from the digital bit-man of the frame-grabbed optical target.

Once the offset-error coefficients are quantified, another program adjusts the expander/contractor scale-ratio factor on a point by point basis (e.g., pixel by pixel across the array length) to include the correction for the optical nonlinearity. Thus for the cited 2.5X scaling example, the pixel indices are "wobbled" by small $\pm\Delta$'s for the new bit-map index values. Finally, in the general-case solution, each image—if any two images to be merged were captured under different optical path parameters—is corrected during scaling to the common merged image with the appropriate correction function (table) to avoid or minimize incongruence in the final output.

In general, documents improperly fed through a scanner exhibit an error comprised of rotation and xy-translation, with the magnitude of the relative components changing in some nonlinear (but continuous) fashion throughout the length of the document. This point is explained by the following example. If the left-side lead-edge of an 11" long document arrives at the scan axis one-fourth inch earlier than the right side, the entry skew angle is 1.3° (from elementary trigonometry, $A_s=\sin^{-1}(\frac{1}{4}''/11'')=1.3$ degrees). Additionally, assume that checking the preprinted triangulation points shows that the document is "slid" sideways (outward) by 0.1"; that is, an x-axis translation offset error is present as well as the rotational error. Further suppose that when the trail-edge of the document leaves the scan axis that the left and right sides of an 8.5" wide document are aligned, e.g., the departure skew is 0°, and finally, the 11" registration edge of the document is tightly against the registration plate of the scanner. This implies that the translation error has also subsided to 0. Thus both components of registration error (rotation and translation) have changed continuously (following some unknown nonlinear function) during the transit of the sheet through the X-scan axis. To correct the stored image of a mis-registered document, adequate coordinate reference information from accessible triangulation marks is required to dynamically update the scaling, rotation and translation correction programs as described in the present invention. Technically, the task is defined as "two dimensional upwarping". In a strict sense triangulation implies only three triangulation marks, as is well known from mensuration theory. But severe nonlinearities (as described above) may require a multiplicity of triangulation marks well beyond the basic three. For example, the regularly spaced NIR or VIS defectable preprinted timing track marks found on many OMR forms could serve as an additional source of triangulation data. In particular, applications of the present invention, processing of stored image data to make such corrections would be desirable.

Additional Merge Applications

While the most common use of the present invention will be merger of a single image (or portion of an image) representing a response-marked form document onto the image of an unmarked master form document, the present system permits other merger operations to be performed as well.

NIR-mode images from multiple response-marked forms can be merged into a common unmarked master form scanned in VIS mode. For example, a student is asked on an exam to draw his/her best representation of a "mathematically correct" ellipse about a preprinted cross-hair point, with the major and minor axes having a two to one ratio, and a maximum dimension of 12 centimeters. In this case, the master form may contain preprinted gridlines, the crosshair, or other nomenclature. The students' sheets contain only the crosshair. Based upon this approach, any number of NIR mode images of student resppnses can be superimposed on a hard-copy printout of the master form; the effect being a "topological density" chart giving an easy-to-interpret visual presentation of the paths followed by the group of respondents in their collective efforts to draw the requested ellipse. Numerous other application examples can be readily imaged, such as the overlay of two specimen signatures, so as to note similarities or differences in size and style and possible indication of forgery, fraud or other misrepresentation. With wider grayscale ranges and suitale merge operators, these techniques may enhance photographic overlay work for forensic analysis.

Opaque merging (pasting) where "last-in" sequence is preserved may be used for such multiple image overlays. In this case, an image from one or more successive documents is pasted into the master form in a Boolean opaque manner, such that the last image merged into the master form is "on top of" any earlier pasted in images. To the extent that the last image is smaller or offset from the earlier images, the outlying fringes of preceding image pasted-transfers will show in the composite.

Using cut, paste and merge programs, multiple areas of interest (AOI's) can be cut from any of the captured images and pasted onto the merged output. A common application using multiple merges is where a multiple set of small rectangular arrays are captured in the OMR mode from a given document (rather than the entire marked response image on the document), then merged into the master form at the respective coordinate locations from where each AOI window or segment originated (after any translation/skew/scaling operations have been executed). These programs can process (e.g, extract) one or more sets of origin x,y coordinate values or alternatively, accept windowed images with coordinate origin header values, and place these AOI's into the specified locations on the merged output.

The same spectrum scan (either VIS or NIR) may be utilized on two or more merged images. For example, several scan passes may be made of the same unmarked master form, but under different lighting conditions or lens settings or other optical conditions, or when using differnt printed samples from a press run to gauge accuracy and consistency of printed product. An examination of the merged composite, either in hard-copy output or on a CRT display, will quickly reveal the quality and repeatability of the master sets. Secondly, multiple NIR-mode user forms, with a preprinted (filled in) response mark pattern, can be scanned and the resulting images merged into a common output image to check tolerances and registration limits on the scanner feed mechanism in the scanner in which they were processed.

The NIR mode and VIS mode scanned documents may be selected to have different preprinted formats. For example, the unmarked "master form" scanned in VIS mode may contain a series of row/column boxes (roster layout) to show a group of names, signatures, test ID numbers, and responses captured from a batch run of many separate NIR mode documents, whereas the NIR mode documents have only one "box" entry per sheet for each respondent's use. After batch scanning of the NIR mode documents is completed, the individual image segments or AOI's extracted from each NIR mode document are merged onto the common "master form", with the merge algorithm calculating appropriate x,y offsets to place the successive AOI's in a roster sequence on the "master form".

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

What is claimed as new and desired to be protected by Letters Patent is:

1. A method for storing multiple scanned images of a response-marked form document in a computer processing system, comprising the steps of:
    (a) scanning a copy of the form document on which no response information has been marked, using a scanning method that detects substantially all visual information present on the form document and produces a pixel image thereof;
    (b) storing the pixel image data from step (a) in a computer storage device;
    (c) scanning at least one copy of the form document that has been marked with at least one response mark that absorbs light falling outside the visible spectrum, using a scanning method that detects only the presence of light outside the visible spectrum and produces a pixel image including said at least one response mark but excluding visual information detected in step (a) that does not absorb light falling outside the visible spectrum;
    (d) compressing the pixel image produced in step (c) to reduce the amount of pixel data used to represent areas of the response-marked form document bearing no marks that absorb light falling outside the visible spectrum; and
    (e) storing the pixel image data obtained from step (d) in a computer storage device.

2. The method recited in claim 1 further comprising the steps of:
    (f) for each response-marked copy of the form document for which a reproduction of the document is desired, decompressing the pixel data stored in step (e) to obtain the pixel image of step (c), and performing a pixel for pixel merge of the pixel images of steps (a) and (c) to produce a single merged pixel image; and
    (g) outputting the merged pixel image from the computer processing system.

3. The method of claim 2 wherein step (g) comprises printing the merged image.

4. The method of claim 2 wherein step (g) comprises displaying the merged image on a video display apparatus.

5. The method of claim 1 wherein the scanning of the document in step (a) is done at a different pixel dimension resolution than the scanning of the document in step (c) and further comprising adjusting the pixel images of steps (a) and (c) with at least one scaling factor to resolve the differences between the two pixel dimension resolutions.

6. A method of storing multiple scanned images of a response-marked form document, comprising the steps of:
    (a) scanning a copy of the form document on which no response information has been marked, using a scanning method with a first pixel grayscale range that detects substantially all visual information present on the form document and produces a pixel image thereof;
    (b) storing the pixel image data from step (a) in a computer storage device;
    (c) scanning at least one copy of the form document that has been marked with at least one response mark that absorbs light falling outside the visible spectrum, using a scanning method that detects only the presence of light outside the visible spectrum and produces a pixel image including said at least one response mark but excluding visual information detected in step (a) that does not absorb light falling outside the visible spectrum, said scanning method of step (c) being done at a different pixel grayscale range than the scanning of the document in step (a);

(d) compressing the pixel image produced in step (c) to reduce the amount of pixel data used to represent areas of the response-marked form document bearing no marks that absorb light falling outside the visible spectrum;

(e) storing the pixel image data obtained from step (d) in a computer storage device; and (f) adjusting at least one of the pixel images of step (a) or (c) in a remapping process to resolve the differences between the two pixel grayscale ranges.

7. The method of claim 2 wherein the documents scanned in steps (a) and (c) contain at least three triangulation marks that are detectable by both the visual scanning of step (a) and the non-visible spectrum scanning of step (c) such that the computer processing system can use the triangulation marks in step (f) to properly align the two pixel images.

8. The method of claim 7 wherein the triangulation marks are used by the computer processing system to deskew the pixel image data from both step (a) and step (c).

9. The method of claim 1 wherein step (b) stores the unmarked form document in terms of one or more predefined areas of interests.

10. The method of claim 1 wherein step (e) stores the response-marked form document in terms of one or more predefined areas of interests.

11. A method for storing multiple scanned images of a response-marked form document, comprising the steps of:

(a) scanning a copy of the form document on which no response information has been marked, using a scanning method that detects substantially all visual information present on the form document and produces a pixel image thereof;

(b) storing the pixel image data from step (a) in a computer storage device;

(c) scanning at least one copy of the form document that has been marked with at least one response mark that absorbs light falling outside the visible spectrum, using a scanning method that detects only the presence of light outside the visible spectrum and produces a pixel image including said at least one response mark but excluding visual information detected in step (a) that does not absorb light falling outside the visible spectrum;

(d) compressing the pixel image produced in step (c) to reduce the amount of pixel data used to represent areas of the response-marked form document bearing no marks that absorb light falling outside the visible spectrum;

(e) storing the pixel image data obtained from step (d) in a computer storage device; and (f) in connection with step (b), processing the unmarked form to a predefined grayscale index level to insure that blank information on the unmarked form will prevail in a merge with overlapped blank information in the pixel image from step (c).

12. A method for storing multiple scanned images of a response-marked form document, comprising the steps of:

(a) scanning a copy of the form document on which no response information has been marked, using a scanning method that detects substantially all visual information present on the form document and produces a pixel image thereof;

(b) storing the pixel image data from step (a) in a computer storage device;

(c) scanning at least one copy of the form document that has been marked with at least one response mark that absorbs light falling outside the visible spectrum, using a scanning method that detects only the presence of light outside the visible spectrum and produces a pixel image including said at least one response mark but excluding visual information detected in step (a) that does not absorb light falling outside the visible spectrum;

(d) compressing the pixel image produced in step (c) to reduce the amount of pixel data used to represent areas of the response-marked form document bearing no marks that absorb light falling outside the visible spectrum;

(e) storing the pixel image data obtained from step (d) in a computer storage device;

(f) processing the pixel images of steps (a) and (c) to correct for optical distortion in the scanning steps (a) or (c), respectively, and for each response-marked copy of the form document for which a reproduction of the document is desired, decompressing the pixel data stored in step (e) to obtain the pixel image of step (c), performing a pixel for pixel merge of the pixel images of steps (a) and (c) to produce a single merged pixel image and; and (g) outputting the merged pixel image from the computer processing system.

13. The method of claim 2 wherein the pixel-for pixel merge uses a merge operator that selects the pixel with the darkest grayscale level as the surviving pixel.

14. The method of claim 2 wherein the pixel-for-pixel merge uses a merge operator that selects the pixel from the response-marked document as the surviving pixel regardless of respective grayscale values.

15. The method of claim 2 further comprising the step of storing the merged pixel image in a computer storage device.

16. An apparatus for storing multiple scanned images of a response-marked form document in a computer processing system, comprising:

first means for scanning a copy of the form document on which no response information has been marked using a scanning method that detects substantially all visual information present on the form document and produces a first pixel image thereof;

second means for scanning at least one copy of the form document that has been marked with at least one response mark that absorbs light falling outside the visible spectrum, using a scanning method that detects only the presence of light outside the visible spectrum and produces a second pixel image including said at least one response mark but excluding visual information detected by said first means that does not absorb light falling outside the visible spectrum;

means for compressing the second pixel image produced by said second scanning means to reduce the amount of pixel data used to represent areas of the response-marked form document bearing no marks that absorb light falling outside the visible spectrum; and means for storing the pixel image data obtained from said first and second scanning means in a computer storage device.

17. The apparatus recited in claim 16 further comprising:
   means for decompressing the stored pixel image data to obtain for each response-marked copy of the form document for which a reproduction of the document is desired, the second pixel image and performing a pixel-for pixel merge of the first and second pixel images to produce a single merged pixel image; and
   output means for outputting the merged pixel image from the computer processing system.

18. The apparatus of claim 17 wherein the output means comprises a printer.

19. The apparatus of claim 17 wherein the output means comprises a video display apparatus.

20. A method for storing multiple scanned images of a response-marked form document, comprising the steps of:
   (a) scanning a copy of the form document on which no response information has been marked, using a scanning method that is responsive to light of a first spectral range and produces a pixel image of those portions of the form document that absorb light in such range;
   (b) storing the pixel image data from step (a) in a memory device;
   (c) scanning at least one copy of the form document that has been marked with at least one response mark that absorbs light falling outside said first spectral range, using a scanning method that detects only the presence of light outside the first spectral range and produces a pixel image including said at least one response mark but excluding visual information detected in step (a) that does not absorb light outside the first spectral range;
   (d) compressing the pixel image produced in step (c) to reduce the amount of pixel data used to represent areas of the response-marked form document bearing no marks that absorb light falling outside the first spectral range; and
   (e) storing the pixel image data obtained from step (d) in a memory device.

21. The method recited in claim 20 further comprising the steps of:
   (f) for each response-marked copy of the form document for which a reproduction of the document is desired, decompressing the pixel data stored in step (e) to obtain the pixel image of step (c), and performing a pixel for pixel merge of the pixel images of steps (a) and (c) based on a pre-defined Boolean or algebraic expression to produce a single merged pixel image; and
   (g) outputting the merged pixel image from the computer processing system.

22. The method recited in claim 21 wherein two or more pixel images are stored as a result of steps (c) through (e) and such two or more images are superimposed in the merger of step (f).

23. The method recited in claim 20 wherein each of the pixel images resulting from steps (a) and (c) has grayscale information of two or more bits per pixel.

* * * * *